(12) United States Patent
Frownfelter

(10) Patent No.: US 7,573,173 B1
(45) Date of Patent: Aug. 11, 2009

(54) APPARATUS FOR AXIAL MAGNETIC FIELD ELECTRIC MOTOR

(75) Inventor: Jerald Frownfelter, Tehachapi, CA (US)

(73) Assignee: Aximet Technology, Inc., Tehachapi, CA (US)

( * ) Notice: Subject to any disclaimer, the term of this patent is extended or adjusted under 35 U.S.C. 154(b) by 0 days.

(21) Appl. No.: 12/107,697

(22) Filed: Apr. 22, 2008

Related U.S. Application Data

(60) Provisional application No. 60/995,926, filed on Sep. 28, 2007.

(51) Int. Cl.
*H02K 23/26* (2006.01)

(52) U.S. Cl. ......................... 310/208; 310/268

(58) Field of Classification Search .................. 310/268, 310/208
See application file for complete search history.

(56) References Cited

U.S. PATENT DOCUMENTS

| | | | | | |
|---|---|---|---|---|---|
| 3,443,133 | A | * | 5/1969 | Henry-Baudot | 310/154.06 |
| 3,452,230 | A | * | 6/1969 | Pearson | 310/180 |
| 4,577,130 | A | * | 3/1986 | Reed | 310/194 |
| 5,744,896 | A | * | 4/1998 | Kessinger et al. | 310/268 |
| 5,945,766 | A | * | 8/1999 | Kim et al. | 310/268 |
| 6,005,320 | A | * | 12/1999 | Kim et al. | 310/156.36 |
| 6,005,324 | A | * | 12/1999 | Kim | 310/268 |
| 6,404,097 | B1 | * | 6/2002 | Pullen | 310/268 |
| 6,424,069 | B1 | * | 7/2002 | Pullen et al. | 310/156.38 |
| 6,580,195 | B1 | * | 6/2003 | Noble et al. | 310/268 |
| 6,912,773 | B2 | * | 7/2005 | Pullen et al. | 29/606 |
| 2002/0067102 | A1 | * | 6/2002 | Dunn | 310/268 |
| 2002/0153792 | A1 | * | 10/2002 | Isozaki et al. | 310/112 |
| 2005/0029899 | A1 | * | 2/2005 | Irving et al. | 310/268 |
| 2006/0012263 | A1 | * | 1/2006 | Smith et al. | 310/268 |
| 2006/0028085 | A1 | * | 2/2006 | Qu et al. | 310/178 |
| 2006/0055265 | A1 | * | 3/2006 | Zalusky | 310/156.32 |
| 2006/0071576 | A1 | * | 4/2006 | Cho | 310/268 |

FOREIGN PATENT DOCUMENTS

| JP | 62123936 A | * | 6/1987 |
|---|---|---|---|
| JP | 06006945 A | * | 1/1994 |

* cited by examiner

*Primary Examiner*—Quyen Leung
*Assistant Examiner*—Alex W Mok
(74) *Attorney, Agent, or Firm*—The Law Offices of Andrew D. Fortney; Andrew D. Fortney; Sharon E. Brown Turner

(57) ABSTRACT

Apparatuses, circuits, and methods for driving an axial field electric motor, and systems using the same. The electric motor generally comprises a fixed magnet assembly having a plurality of fixed magnets arranged circularly around a shaft, a coil assembly including a plurality of coil layers, and a controller configured to provide each of a plurality of drive signals to one of the coil layers. Each of the drive signals generally has a different phase (e.g., each drive signal may pulse and/or oscillate with different phase offsets). The fixed magnets generally have north-south axes parallel to the shaft (e.g., the magnetic field is axial to the shaft). Each of the coil layers generally comprises a plurality of electromagnetic coils arranged circularly around the shaft in plane that is substantially perpendicular to the shaft. Each of the electromagnetic coils comprises a conductive spiral wound in the plane of the coil layer. Each coil layer is mechanically coupled to another of the coil layers in the coil assembly. Electric motors according to the present invention are advantageously efficient and lightweight and provide for coil assemblies that can be stacked for additional torque.

30 Claims, 12 Drawing Sheets

APPARATUS FOR AXIAL MAGNETIC FIELD ELECTRIC MOTOR

RELATED APPLICATIONS

This application claims the benefit of U.S. Provisional Application No. 60/995,926, filed Sep. 28, 2007, incorporated herein by reference in its entirety.

FIELD OF THE INVENTION

The present invention generally relates to the field of electric motors. More specifically, embodiments of the present invention pertain to apparatuses, circuits, systems, and methods for driving an axial field electric motor.

DISCUSSION OF THE BACKGROUND

Electric motors use electrical energy to produce mechanical energy. In conventional brushless DC motors, a controller (generally external to the motor) generates a control signal that is synchronized to the rotor's position. One or more permanent magnets are attached to an external rotor, and one or more Hall-effect sensors are used to sense the position of the rotor. The stator (e.g., the non-moving part of the motor) conventionally includes an armature including three phases of driving coils. The coils are activated by the controller in response to signals from the Hall-effect sensors. The changing current signals that are produced by the controller produce magnetic fields, which interact with the magnetic fields of the fixed magnets to cause the rotor to rotate with respect to the stator.

Electrical motors are used in a wide variety of applications. For example, leisure applications may include wheeled vehicles such as golf carts, neighborhood electrical vehicles (NEVs), electric bicycles and motorcycles. Smaller motors may be used by hobbyists in radio-controlled wheeled vehicles and aircraft. Industrial applications may include electrical burden and/or utility carriers and electric tow tractors. More advanced applications may include electric and/or hybrid vehicles, military scout vehicles, and unmanned aerial vehicles (UAVs), among others.

In general there is a desire to improve the overall efficiency of all types of electric motors (or generators). In particular, it is desirable to improve performance of an electric motor to achieve a higher power output with lower weight and smaller size. Conventional electric motors have reached certain limits. For example, it is well-accepted that an increased magnitude of current flowing through an armature will translate generally into increased torque and horsepower, all other factors being equal. However, the way conventional armatures are wound has limited the amount of copper that can be disposed in a magnetic field. This limits the amount of current that can be passed through the armature, and results in limited maximum torque and horsepower.

The amount of copper that can be disposed in a magnetic field may be limited by the paths taken by the conductor leads that supply current to each coil. This may be the case, for example, when the individual coils are wound on a plane that includes a thickness of only one winding, or stated in another way, when the thickness of each individual coil is equal to that of the lead (wire size). In such a coil, one coil lead (i.e., an outside lead) leading to or from the coil is disposed on the plane of the coil and a remaining coil lead (i.e., an inside lead) must pass over the coil to exit. The overall effective thickness of the coil then becomes the thickness of two wire diameters. The two-lead diameter effective thickness of each conventional dual layer type of coil thus separates the planes of adjoining parallel coils. The increased thickness of the coil increases the distance that the magnets above and below the coil layer(s) are disposed from each other. The magnetic field strength (i.e., magnetic flux) is thereby decreased, generally resulting in decreased torque and horsepower. This is especially true with axial field motors that have multiple wound coils that are arranged radially on a plane to form a planar radial coil assembly. When a plurality of the planar radial coil assemblies are located adjacent to each other to form a stator, the distance between the adjoining coils is increased by the thickness of the leads. Thus, it is desirable to arrange a plurality of coils on adjacent parallel planes and wire them either in series or in parallel to increase the electrical power that is passing through the coils and therefore the performance of the motor or generator.

Conventional mechanical constraints relating to coil lead ingress and egress have generally caused the individual coils of the planar radial coil assembly to be placed apart from each other radially (i.e. to have a greater arc spacing between the coil assemblies) and also for each planar radial coil assembly that is disposed apart from an adjoining planar radial coil assembly. Therefore, it is desirable to place the coils closer to each other radially and/or laterally. Other areas for improvement may include minimizing tolerances and therefore the spacing between the armature and the rotor magnets so as to further increase magnetic field strength. It may also be desirable to improve the shape of the coils and/or the effective or active area of the coils, improve a feedback signal of the rotor position as an input to a controller that supplies an electrical waveform to drive the motor, and/or increase the number of phases.

Still other areas in which improvement are desired include minimizing errant magnetic flux, providing a maximum amount of redundant components to drive down cost of manufacture, providing a versatile design that uses a standard single rotor and stator assembly for a basic motor (or generator) configuration that can be stacked longitudinally so as to increase the number of stator and rotor pairings using as many sections as desired to increase torque and horsepower to the desired degree, reducing the number of electrical leads inside the motor that can become intermittent or fail, improving motor longevity (life expectancy), improving motor cooling without adding fans or other parts that decrease efficiency, and especially improvements that minimize the size and weight of the motor.

Existing applications would benefit from such improvements and new applications are likely to arise. Minimizing the cost of manufacture of an improved axial field motor would further expand the desirability of such a motor.

For example, electric motor-powered aircraft—from radio controlled aircraft to human carrying ultra-light aircraft—stand to gain from such improvements. A generally accepted threshold for using electric motors to power hang gliders (or other types of ultra light aircraft) is a minimum of about 15 HP at about 2800 rotations-per-minute (RPM), where the motor weighs about one-half of the weight of the current most-efficient motor designs. Ideally, such a motor would also be economical so as to not preclude its use in many new or old applications.

Similarly for radio controlled aircraft, if a comparable performance electric motor is provided that is lighter in weight than its predecessor then, for any given combined weight of motor and batteries that a radio controlled model airplane can carry, additional batteries can be carried that equal the difference gained by reducing the weight of the motor. This directly translates into greater airtime and therefore greater performance and/or enjoyment for the user.

It is also desirable for certain applications to be able to eliminate the need for a gear box. This can save weight if the RPM of the output shaft is equal to that which is desired to drive the load. It also improves efficiency as all mechanical gear reduction or gear increase types of drives also consume power. Therefore, there remains a long-standing need to use motor design and especially motor diameter as a means of controlling RPM, thereby eliminating the need for a gearbox in certain applications. This would save additional weight, improve efficiency, and decrease the number of component parts that can fail.

In order to reduce costs, it is desirable to manufacture components that can be used in a variety of different configurations that produce different power, torque, or RPM outputs. For example, it is desirable to provide a design in which additional offset coil layers, or fields, may be stacked top of one other which may supply greater power and decrease ripple (e.g., with a phase delay for each layer).

SUMMARY OF THE INVENTION

Embodiments of the present invention relate to electric motors, controllers, controller circuits, methods of propelling an electric motor, and software and/or hardware implementations of such methods. The electric motor generally comprises a fixed magnet assembly having a plurality of fixed magnets arranged circularly around a shaft, a coil assembly including a plurality of coil layers, and a controller configured to provide each of a plurality of drive signals to one of the coil layers. Each of the drive signals generally has a different phase (e.g., each drive signal may pulse and/or oscillate at the same frequency with different phase offsets). The fixed magnets generally have north-south axes parallel to the shaft (e.g., the magnetic field is axial to the shaft). Each of the coil layers generally comprises a plurality of electromagnetic coils arranged circularly around the shaft in plane that is substantially perpendicular to the shaft. Each of the electromagnetic coils comprises a conductive spiral (e.g., a metallic wire) wound in the plane of the coil layer. Each coil layer is mechanically coupled to another of the coil layers in the coil assembly.

In one exemplary embodiment, the conductive spiral of each electromagnetic coil comprises a wire having a metallic core with a thermoplastic coating. The thermoplastic coating of each wind of each of the electromagnetic coils may be fused to the thermoplastic coating of an adjacent wind of the coil. In addition, the thermoplastic coating of the electromagnetic coils of each coil layer may be fused to the thermoplastic coating of the electromagnetic coils of another coil layer.

In some embodiments, the drive signals may comprise square wave signals. In other embodiments, the drive signals may comprise sine wave signals. Alternatively, the drive signals may comprise square wave signals when the shaft is rotating at a speed below a threshold (e.g., when the motor is starting and/or at speeds up to several hundred RPM) and may comprise sine wave signals when the shaft is rotating at a speed above the threshold. In preferred embodiments the drive signals are current-driven.

The rotor (e.g., moving) portion of the electric motor generally includes the fixed magnet assembly and the shaft. The stator (e.g., stationary) portion of the motor may include a sensor configured to sense a position of at least one of the fixed magnets. For example, the sensor may be a Hall-effect sensor. In an exemplary embodiment, the controller is further configured to adjust one or more of the drive signals in response to the sensor output.

In one exemplary embodiment, the motor may be a two-phase motor where the plurality of coil layers comprises a first coil layer and a second coil layer and each electromagnetic coil of the second coil layer has an angular offset of half of its width from one of the electromagnetic coils in the first coil layer. Thus, the plurality of drive signals may include a first drive signal having a first phase and a second drive signal having a second phase that is offset 90° from the first phase.

In another exemplary embodiment, the motor may be a four-phase motor where the plurality of coil layers comprises a first coil layer, a second coil layer wherein each electromagnetic coil of the second coil layer has an angular offset of one-half of its width from one of the electromagnetic coils in the first coil layer, a third coil layer wherein each electromagnetic coil of the third coil layer has an angular offset of one-fourth of its width from one of the electromagnetic coils in the first coil layer, and a fourth coil layer wherein each electromagnetic coil of the fourth coil layer has an angular offset of one-half of its width from one of the electromagnetic coils in the third coil layer.

In a four-phase embodiment, the plurality of drive signals may comprise a first drive signal having a first phase, a second drive signal having a second phase that is offset 90° from the first phase, a third drive signal having a third phase that is offset 45° from the first phase, and a fourth drive signal having a fourth phase that is offset 135° from the first phase. In a further embodiment, the coil assembly comprises two of each of the first, second, third, and fourth layers of electromagnetic coils. Thus, the coil assembly may comprise eight coil layers (or other multiple of the number of phases).

The coil assembly may include a coil assembly base configured to electrically couple the drive signals to electromagnetic coils in the coil layers. In one exemplary embodiment, the coil assembly base comprises two printed circuit boards, wherein each of the electromagnetic coils is electrically coupled to one of the printed circuit boards, and a plurality of conductive stand-offs, each of the stand-offs being mechanically coupled to the printed circuit boards and electrically coupled to one or more of the electromagnetic coils. In a further embodiment, the electric motor may comprise a plurality of the coil assemblies, wherein the conductive stand-offs of each of the plurality of coil assemblies are electrically and mechanically coupled to corresponding conductive stand-offs in another one of the coil assemblies. Thus, the coil assemblies may be stacked to provide additional torque. In yet another embodiment, the electric motor includes a plurality of the fixed magnet assemblies, wherein at least one of the fixed magnet assemblies is located between two of the coil assemblies. Thus, the rotor may include fixed magnets placed between each coil assembly.

The embodiments also include a method of propelling a shaft in an electric motor. The electric motor generally has a fixed magnet assembly comprising a plurality of fixed magnets arranged circularly around the shaft, wherein the fixed magnets have north-south axes parallel to the shaft. The method comprises applying each of a plurality of drive signals to one of a plurality of coil layers. Each of the coil layers comprises a plurality of electromagnetic coils. As described with respect to the electric motor, above, the coil layers upon which the method operates generally comprise a plurality of electromagnetic coils arranged circularly around the shaft in plane that is substantially perpendicular to the shaft. Each of the electromagnetic coils is wound in the plane of the coil layer, and the coil layers are mechanically coupled together. Each of the drive signals has a different phase.

In a further embodiment, the method comprises sensing a position of at least one of the fixed magnets. For example, the sensing step may use a Hall-effect sensor. The drive signals may be generated in response to a speed and/or position of the magnets. The drive signals may comprise square wave signals and/or sine wave signals. In preferred embodiments, the drive signals comprise square wave signals when the shaft rotates at a speed below a threshold speed and the drive signals comprise sine wave signals when the shaft rotates at a speed above that threshold.

The present method may be embodied in computer-readable medium comprising computer-executable instructions adapted to perform the method. Alternatively, the method may be implemented in hardware, software, and/or firmware as a controller for an electric motor.

The present invention advantageously provides an efficient and lightweight electric motor having coil assemblies that can be stacked for additional torque. These and other advantages of the present invention will become readily apparent from the detailed description of preferred embodiments below.

DETAILED DESCRIPTION OF THE PREFERRED EMBODIMENTS

Figure 1:
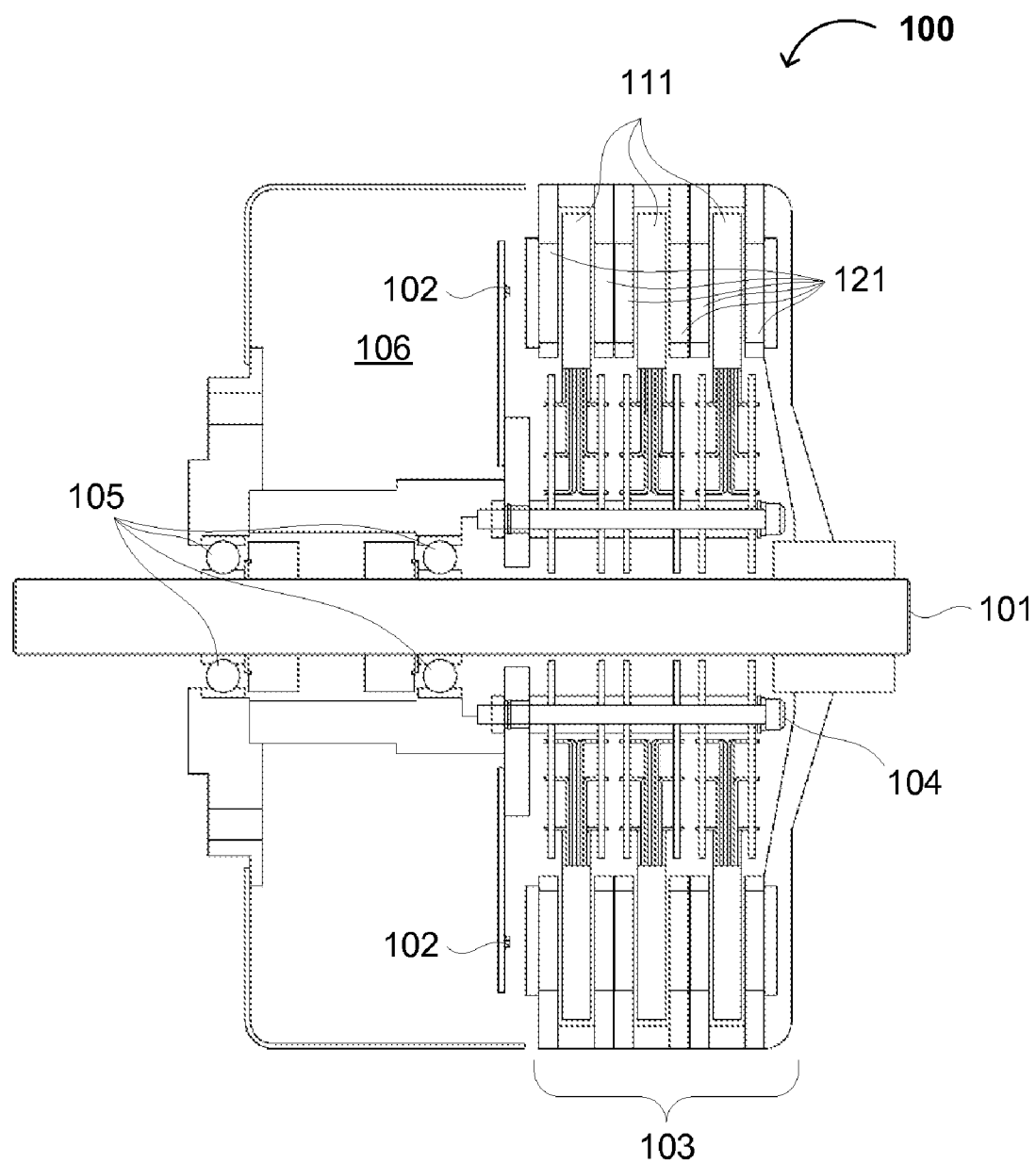
FIG. 1 is a cross section of an exemplary motor according to the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, processing, and other symbolic representations of operations within a computer, processor, controller and/or memory. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a data processing device or system. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "calculating," "determining," "manipulating," "transforming" or the like, refer to the action and processes of a computer or data processing system, or similar processing device (e.g., an electrical, optical, or quantum computing or processing device), that manipulates and transforms data represented as physical (e.g., electronic) quantities. The terms refer to actions and processes of the processing devices that manipulate or transform physical quantities within the component(s) of a circuit, system, or architecture into other data similarly represented as physical quantities within other components of the same or a different system or architecture.

For convenience and simplicity, the terms "clock," "time," "rate," "period" and "frequency" are generally interchangeable herein, but are generally given their art-recognized meanings. Also, for convenience and simplicity, the terms "connected to," "coupled with," "coupled to," may be used interchangeably, but these terms are generally given their art-recognized meanings.

It is generally well known that a motor, when driven by external means, can function as a generator. It is to be understood that when the motor is operated as a generator that many of the objects of the present invention will apply to its usage as a generator as well.

An Exemplary Motor

FIG. 1 shows a cross section of an exemplary embodiment of an axial motor 100 according to the present invention. In region 103, coil assemblies 111 and fixed magnets 121 are arranged radially around shaft 101. Fixed magnets 121 are generally part of a rotor assembly fixedly attached to shaft 101. Coil assemblies 111 are generally part of a stator assembly (e.g., the non-rotating portion of the motor) attached to the shaft at bearing assemblies 105. The fixed magnets 121 generally have north-south axes parallel to the shaft 101 (e.g., the magnetic field is axial to the shaft). Each coil assembly 111 generally includes a plurality of coil layers. Each of the coil layers generally comprises a plurality of electromagnetic coils. Each of the electromagnetic coils comprises a wire wound on itself in a first plane. The coils are generally arranged circularly around the shaft in a second plane substantially perpendicular to the shaft. The second plane is substantially coplanar with the first planes of the electromagnetic coils (e.g., the coils lie flat in each coil layer). Each coil layer is mechanically coupled (e.g., adhesively or otherwise attached) to another of the coil layers.

Motor 100 also generally includes a controller (not shown), which may be external to the motor or integrated in the motor housing (e.g., in space 106 of motor 100). Alternatively, individual components of the controller (e.g., power supply, processor, digital-to-analog converters [DACs], or other components or subcomponents thereof) may be located internally, externally, or in any other appropriate location. The controller is generally configured to provide each of a plurality of drive signals to at least one of the coil layers of each coil assembly 111. Each of the drive signals generally has a different phase (e.g., each drive signal may pulse and/or oscillate at the same frequency with different phase offsets). Sensor 102 is generally configured to sense a position of at least one of the fixed magnets 121. For example, sensor 102 may be a Hall-effect sensor. In preferred embodiments, the controller is configured to adjust the drive signals in response to an output of sensor 102, as described in more detail below.

Figure 2A:
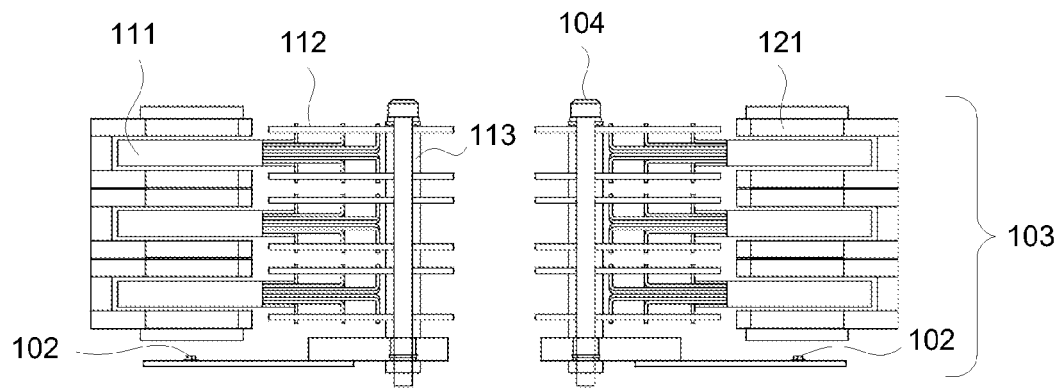
FIG. 2A is a cross section of a stack of electromagnetic coil assemblies and fixed magnet assemblies according to the present invention.
Figure 2B:
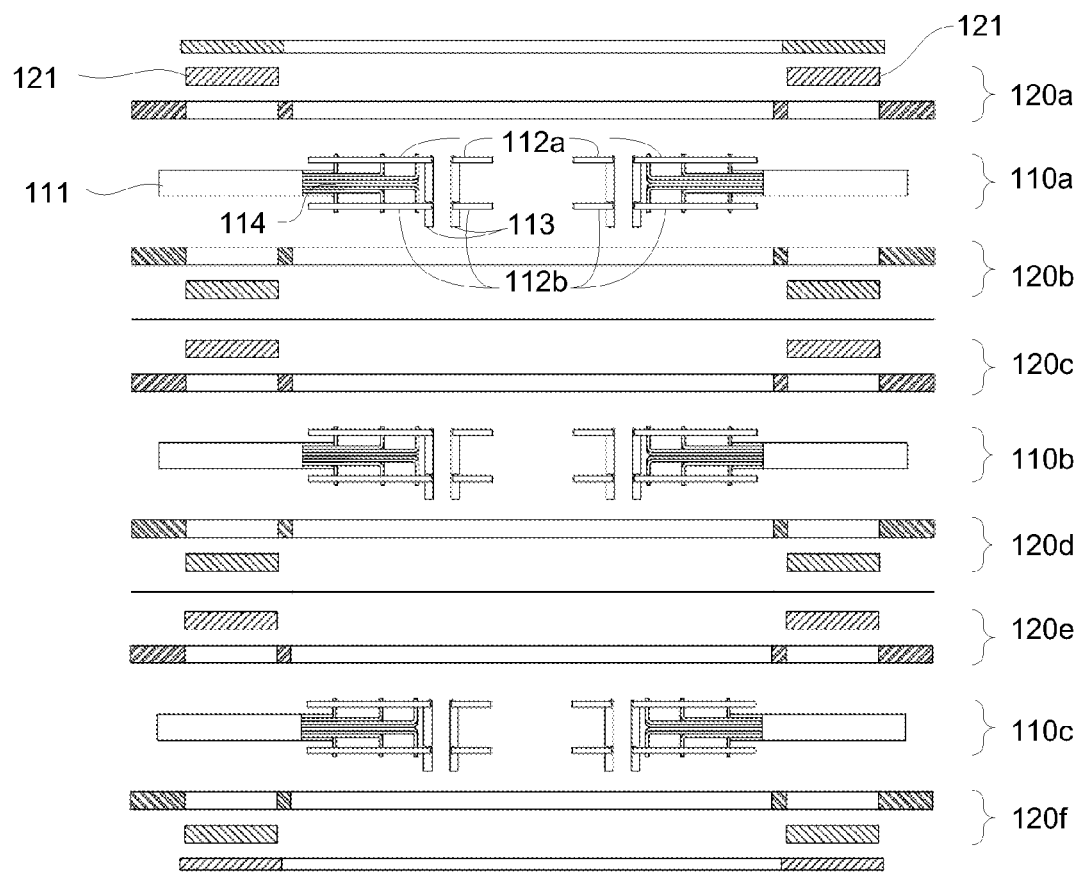
FIG. 2B is an exploded cross section of a stack of electromagnetic coil assemblies and fixed magnet assemblies according to the present invention.

Referring now to FIG. 2A, the cross section of region 103 including coil assemblies 111 and fixed magnet assemblies 121 is shown. In FIG. 2B, the same cross section of region 103 is shown in an exploded view. The exemplary motor shown in FIGS. 1, 2A, and 2B has three substantially identical coil assemblies 110a-110c and corresponding fixed magnet assemblies 120a-120f. However, it is a feature and advantage of the present invention that coil assemblies and corresponding fixed magnet assemblies may easily be added or removed (e.g., to increase or decrease the torque output of a motor). Each coil assembly includes a plurality of coil layers 111 (e.g., as described below with respect to FIGS. 3A-3C), leads 114 from the coils in coil layers 111 to circuit boards 112 (including 112a and 112b of FIG. 2B) that generally function as coil assembly bases. Stand-offs 113 mechanically and electrically couple the circuit boards 112 together, and provide attachment points for stacking multiple coil assemblies.

For example, stand-offs 113 attached to the circuit boards/ coil assembly bases 112 may be aligned and mechanically and electrically coupled to corresponding stand-offs in the other coil assembles by means of bolts 104. In one exemplary embodiment stand-offs 113 comprise metallic bushings with openings to accommodate bolts 104. The openings may be smooth, threaded, notched, or have other features appropriate for mechanically and electrically coupling stacked coil assemblies. Similarly, the ends and outer edges of the stand-offs 113 may be straight or may have features appropriate for mechanical and/or electrical attachment to additional coil assemblies, to the coil assembly base(s), and or other components of the motor.

FIG. 2A shows two bolts 104 coupled to two stand-offs 113 in the cross section of each coil assembly. However, generally each assembly will have at least enough stand-offs to provide a drive signal for each phase of the motor. For example, in a two-phase motor generally at least four stand-offs would be provided. Similarly, a four-phase motor generally has at least eight stand-offs (see, for example, the eight stand-off holes 623 in FIG. 6B, described in more detail below). However, more stand-offs may be provided for additional signaling, better mechanical support, etc. A person skilled in the art will be able to select an appropriate stand-off configuration (e.g., inner and outer diameters, length, material, etc.) for a particular application.

Figure 3A:
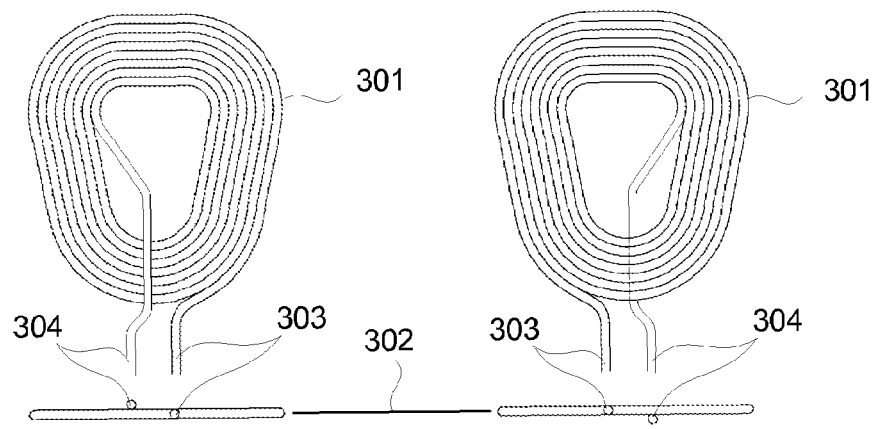
FIG. 3A is a front and back view of an exemplary electromagnetic coil according to the present invention.

FIG. 3A shows front and rear views of an exemplary coil 301. In one exemplary embodiment, the wire of each electromagnetic coil comprises a metallic core with a thermoplastic coating. The wire may also have an insulator between the thermoplastic coating and the metallic core. Preferably, the thermoplastic coating has a lower melting temperature than the insulator. One exemplary type of wire meeting this requirement is MWS Industries Bond (999) Bondable Magnet Wire. The thermoplastic coating of each wind of each of the electromagnetic coils may be fused to the thermoplastic coating of an adjacent wind of the coil to provide, for example, physical stability and/or strength to the coil. The thermoplastic coating may comprise, for example, polyvinyl butyral, epoxy, polyester, aromatic polyamide, or other appropriate materials. The coils may be bonded by solvents, heat, and/or resistance bonding. For example, the coils may advantageously be fused by running a current through the coil sufficient to heat the wire to a temperature above the melting point of the thermoplastic coating, but below the melting point of the insulator. See, for example, U.S. patent application Ser. No. 12/107,706, filed concurrently herewith, the contents of which are hereby incorporated by reference, describing methods and apparatuses for producing electromagnetic coils and coil assemblies suitable for use in motors according to the present invention.

As shown in FIG. 3A, the winds of coil 301 generally lie in plane 302. One lead 303 may project from the coil in the same plane 302, but lead 304 crosses the winds of coil 301 above or below plane 302. Two layers of coils may be stacked closely using the arrangement shown in FIG. 3B. For example, coils 310 and 312 (generally configured like coil 301, and including first leads 303a and 303b) may be in a first layer of coils. Leads 304a and 304b cross below the winds of coils 310 and 312 in the plane of a lower layer of coils that includes coil 311 (including lead 303c) such that leads 304a and 304b lie on either side of coil 311. Coil 311 is flipped over with respect to coils 310 and 312, and lead 304c crosses over the winds of coil 311 in the plane of coils 310 and 312 such that lead 304c lies between coils 310 and 312. This pattern may be repeated around to form two complete circular arrangements of electromagnetic coils. Thus, two layers of coils may be stacked to have a thickness of only two wires, even though each coil has one lead crossing over the winds of the coil.

Figure 3B:
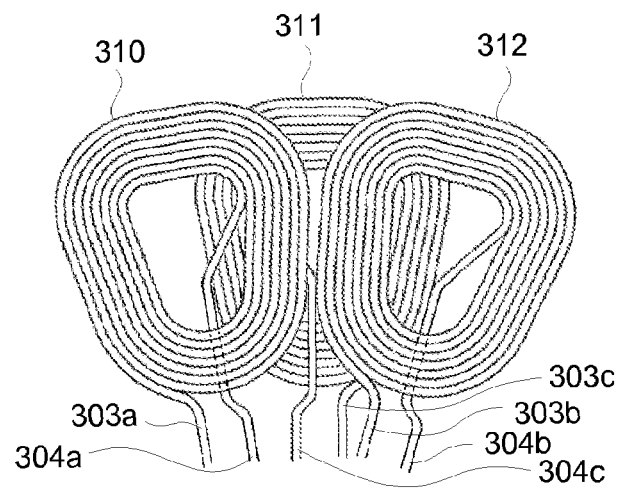
FIG. 3B is a drawing of an arrangement of electromagnetic coils according to the present invention.
Figure 3C:
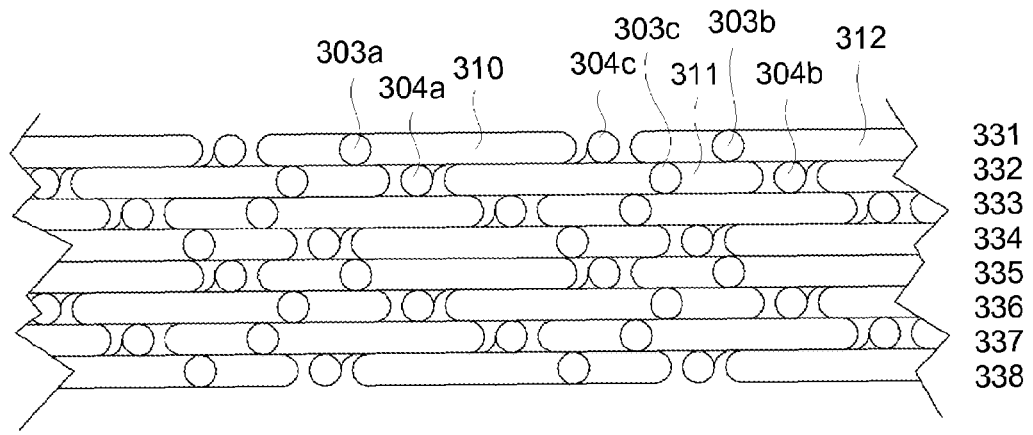
FIG. 3C is a lead-end view of a stack of layers of electromagnetic coils according to the present invention.

FIG. 3C shows a lead-end view of several layers of coils, including coils 310, 311, and 312 of FIG. 3B. First layer of coils 331 includes coils 310 and 312. Second layer of coils 332 includes coil 311. In this arrangement, the coils in second layer 332 (e.g., coil 311) are offset by half the width of a coil from the coils in first layer 331 (e.g., coils 310 and 312). Generally, each during operation of the motor each coil passes over two fixed magnets having opposite polarities. Thus, the direction of current flow is generally reversed in each alternating coil in a layer (as further described below). As a result, the coils in second layer 332 may receive a drive signal that oscillates 90° out of phase with the coils in first layer 331 (e.g., with respect to fixed magnets such as the magnets in the rotor magnet assemblies 120a-120f of FIG. 2B). In a two-phase embodiment (not shown), similar pairs of layers may be stacked (with each layer of coils being aligned with either the first layer or the second (90° out of phase) layer.

Alternatively, in a four phase motor two additional layers (e.g., layers 333 and 334 with leads interleaved between them) may be offset from coils in the first layer 331 by one fourth of a coil's width and three fourths of a coil's width, respectively. A set of four layers may then be repeated as necessary. For example, the coil assembly may comprise eight layers 331-338, with the first four layers 331-334 repeated as layers 335 and 338. An eight-layer assembly is advantageous because, when fixed magnets (e.g., fixed magnet assemblies 120a and 120b of FIG. 2B) are placed above and below the coil assembly (e.g., coil assembly 110a of FIG. 2B), then each phase-coupled pair (e.g., 331 and 335, 332 and 336, 333 and 337, and 334 and 338) has approximately the same average distance from each fixed magnet.

Figure 4:
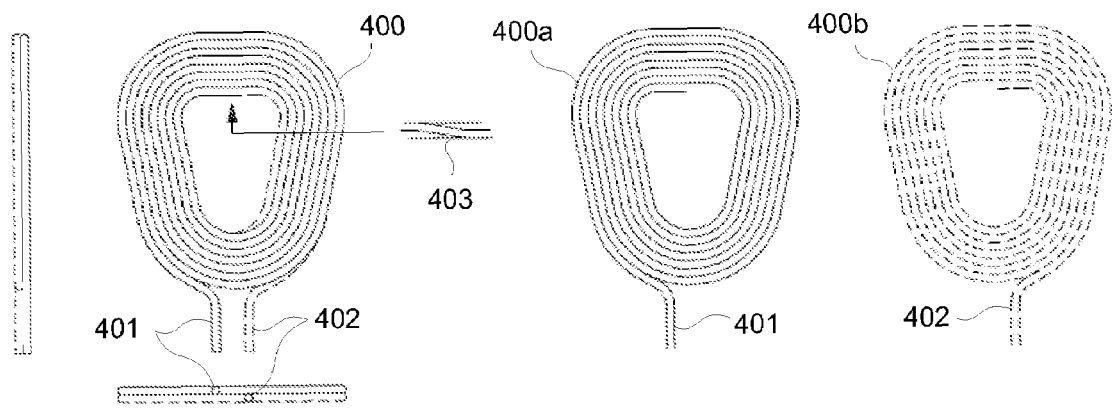
FIG. 4 is a drawing of an alternative exemplary electromagnetic coil according to the present invention.

An alternative coil 400 is shown in FIG. 4. In the alternative coil, the wire is wound twice. Lead 401 enters the coil in a first winding 400a, and the wire is wrapped around itself once, then at transition 403 enters a second winding 400b ending in a second lead 402.

Figure 5:
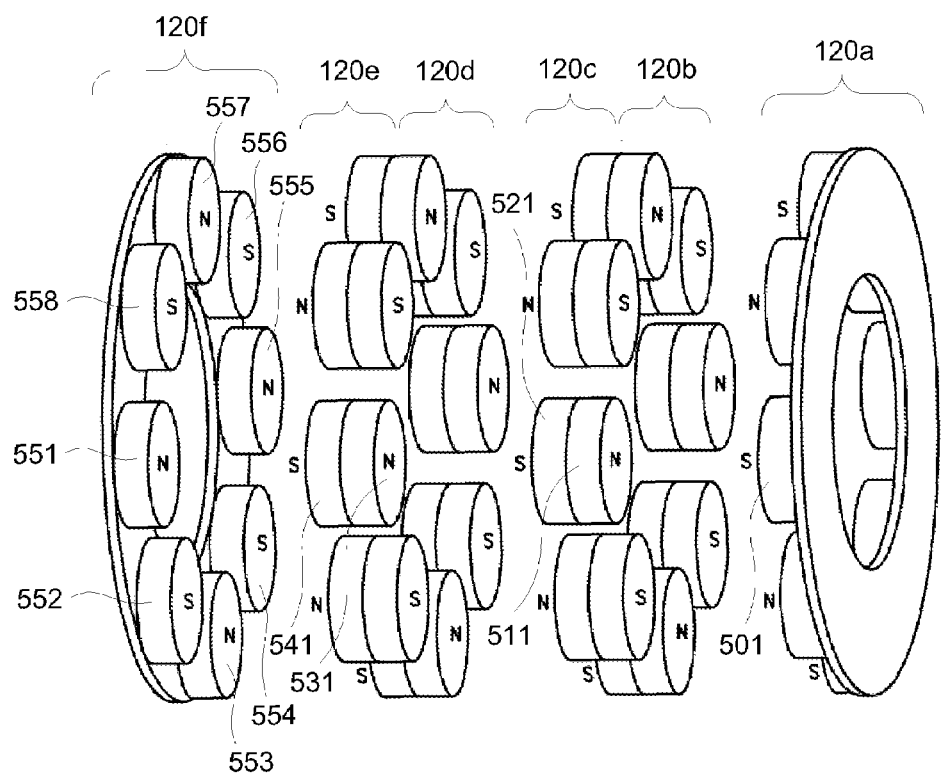
FIG. 5 is a drawing of an exemplary arrangement of fixed magnets in a motor according to the present invention.

FIG. 5 shows an exemplary arrangement of fixed magnets, with the accompanying magnet assemblies and coil assemblies omitted. The magnets of magnet assembly 120b (e.g., magnet 501) and magnet assembly 120a (e.g., magnet 511) are generally placed on either side of a coil assembly (e.g., coil assembly 110a of FIG. 2B). The magnets of each magnet assembly 120a-120f are generally aligned so that the magnets in each magnet assembly have the same north-south axial direction as corresponding magnets in the other magnet assemblies. For example, magnets 501, 511, 521, 531, and 551 all generally have the same north-south axial direction. Meanwhile, adjacent magnets in the same assembly generally have opposite north-south axial directions. For example, magnets 558 and 552 in assembly 120f have a north-south axial direction that is opposite of the north-south axial direction of magnet 551.

It will be recognized that the arrangement of fixed magnets 501, 511, 521, 531, 541, 551, 552, 553, 554, 555, 556, 557 and 558, shown in FIG. 5 is exemplary, and that the number of fixed magnets may vary based on the size of the motor, the number of phases, and other factors familiar to a person skilled in the art. Furthermore, the composition of the fixed magnets may vary. Some materials (e.g., neodymium-iron-boron) may have stronger magnetic fields, which generally provide for a more powerful and/or more efficient motor, while other materials (e.g., ceramic magnets) may be less expensive. A person skilled in the art will be able to select an appropriate magnet in accordance with the design parameters of a particular application.

FIGS. 6A-6D show four exemplary coil layers of a coil assembly (e.g., coil assembly 110a of FIG. 2B) for a four-phase motor. Each coil layer is shown with respect to an exemplary positioning (e.g., when the motor is at rest or when at a fixed point of time) of fixed magnets 121a and 121b, where fixed magnets 121a have a first polarity (e.g., where the north pole of the magnet is directed toward the viewer) and fixed magnets 121b have second polarity (e.g., where the south pole of the magnet is directed toward the viewer).

Figure 6A:
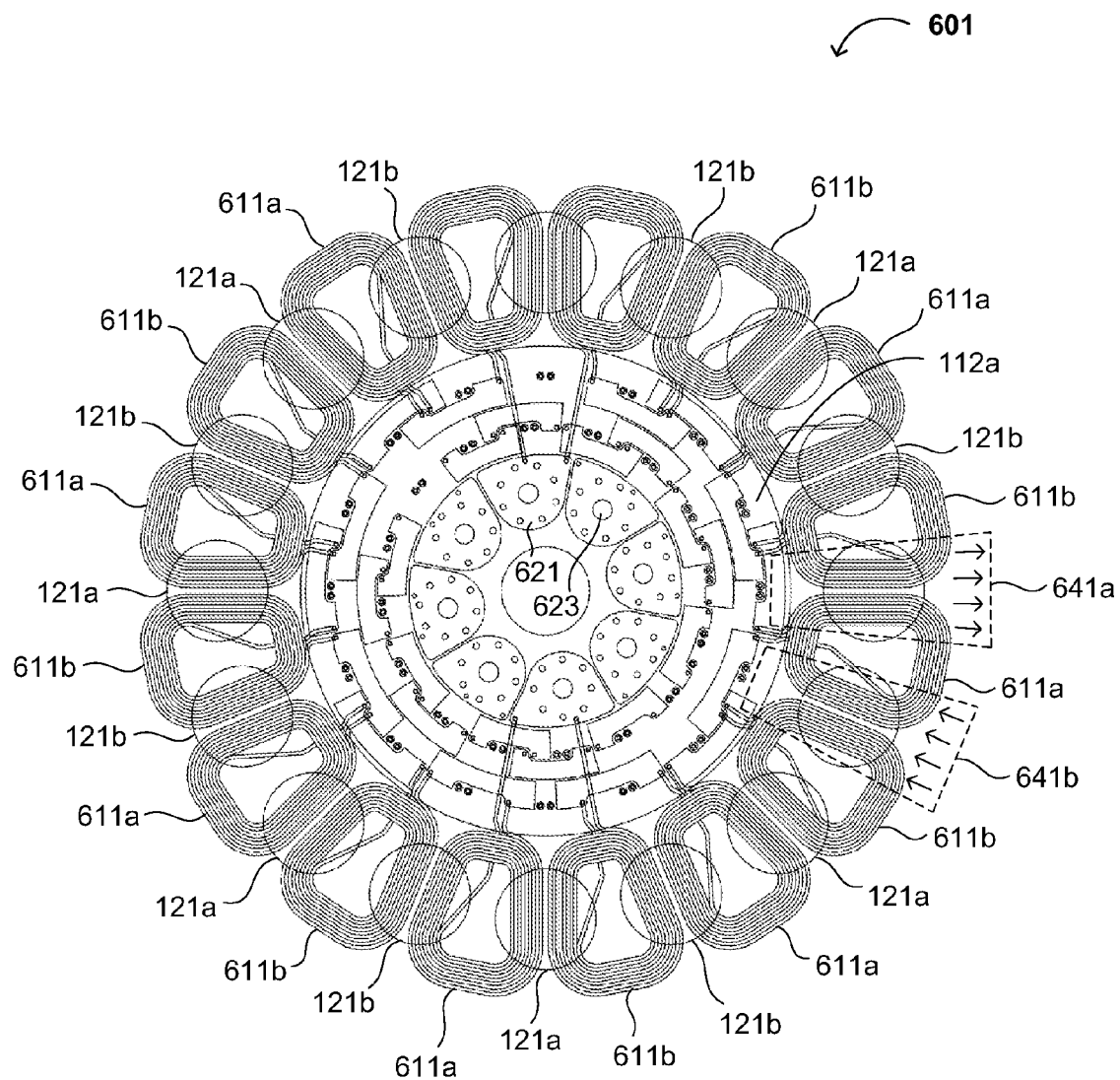
FIGS. 6A-6D are drawings of layers of electromagnetic coils in a motor according to the present invention.

FIG. 6A is a view of a first layer 601 (e.g., corresponding to layer 331 and/or layer 335 in FIG. 3C) of coils. Electromagnetic coils 611a and 611b are electrically and mechanically coupled (e.g., by soldering) to coil assembly base 112a. Coil assembly base 112a may comprise a printed circuit board arranged to distribute a drive signal from stand-off pads 621 (e.g., configured to be coupled to stand-offs 113 of FIG. 2B) to the coils 611a and 611b.

The traces of the printed circuit board may be configured to deliver the drive signal to the coils 611a and 611b in serial and/or in parallel, depending on the requirements of a particular application. In a preferred embodiment, the directions of current applied to coils 611a and coils 611b are respectively reversed. Thus, for example, in region 641a current flows through the adjacent wires of coils 611a and 611b in one direction with respect to the center shaft (e.g., away from the center shaft), while in region 641b current flows through the adjacent wires of coils 611a and 611b in the opposite direction (e.g., toward the center shaft). As a result, electromagnetic force generally propels regions 641a and 641b in the same direction if they are in reversed magnetic fields (e.g., when region 641a is over a fixed magnet 121a having a first polarity and region 641b is over a fixed magnet 121b having an opposite polarity).

Figure 6B:
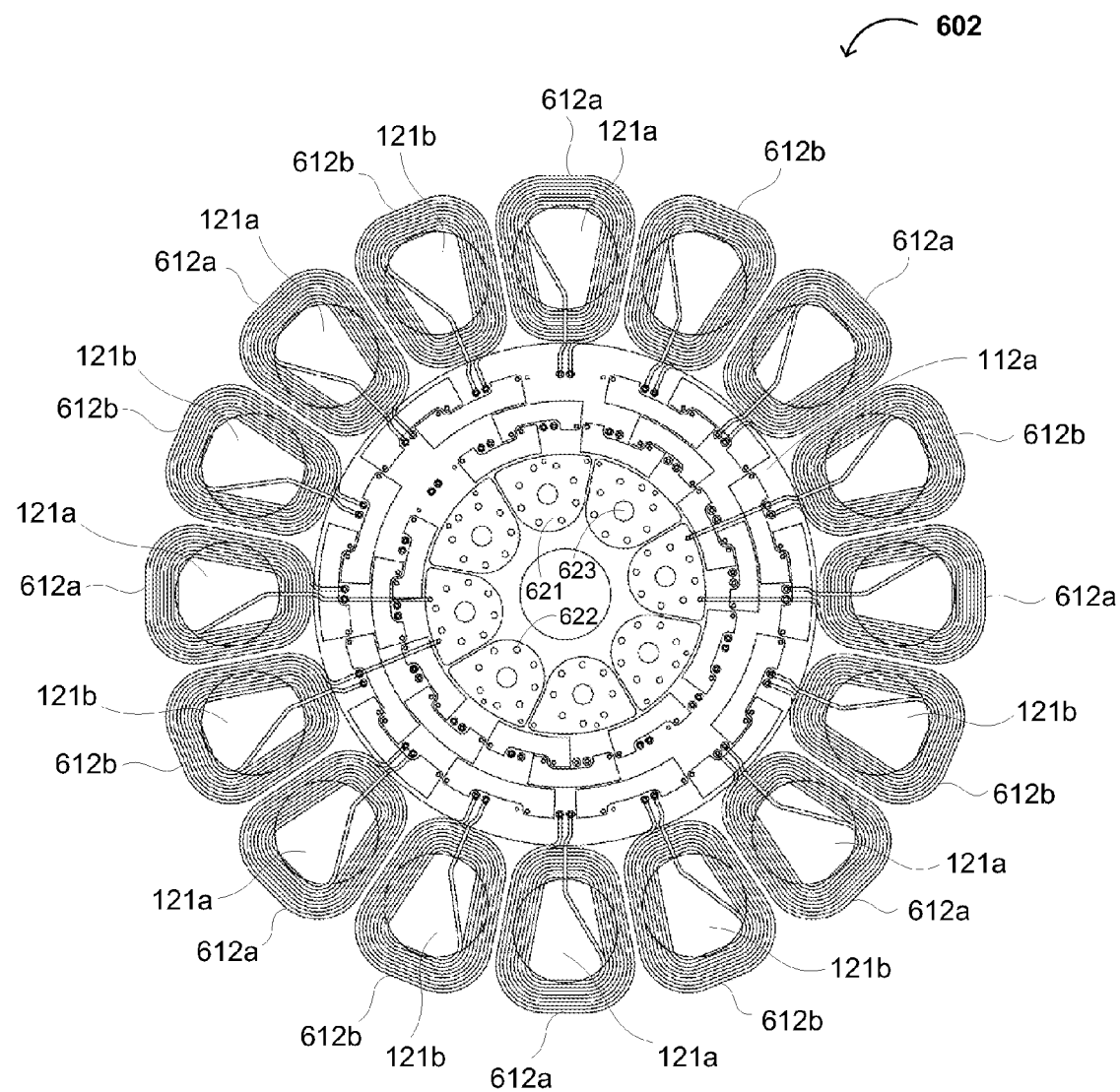
Figure 6C:
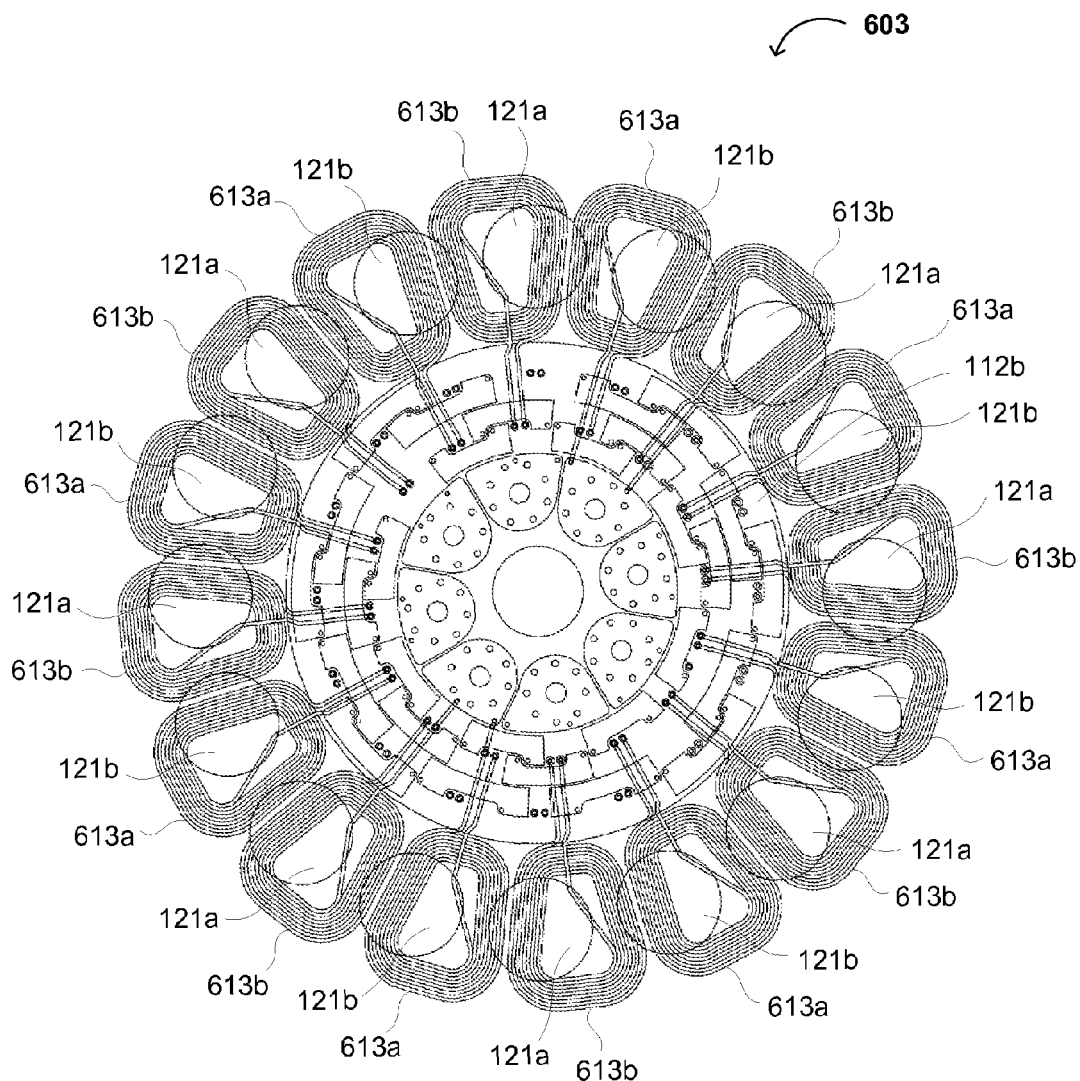
Figure 6D:
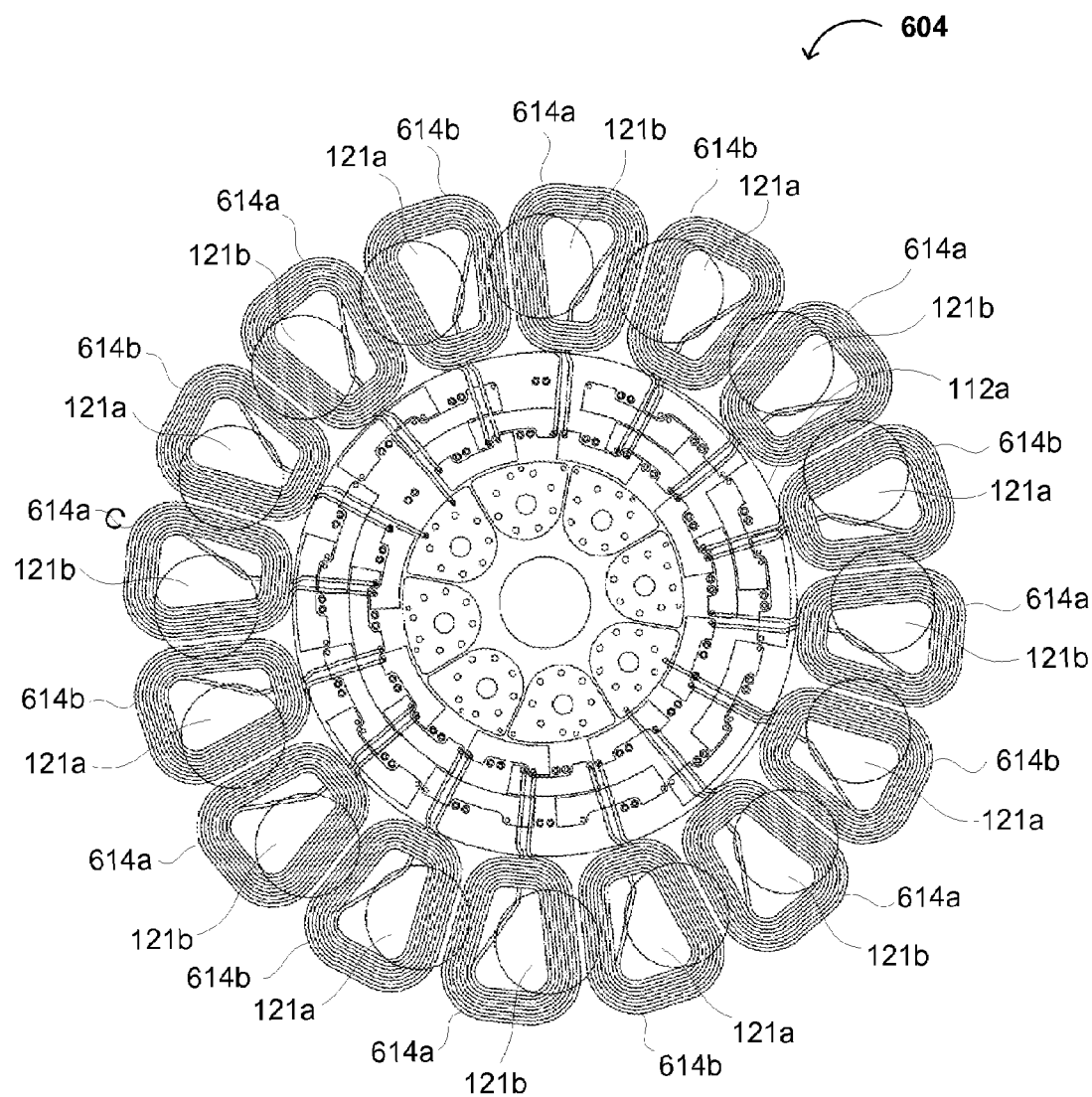

FIG. 6B is a view of a second layer 602 (e.g., corresponding to layer 332 and/or layer 336 in FIG. 3C). Electromagnetic coils 612a and 612b are electrically and mechanically coupled to coil assembly base 112a. Similarly, FIGS. 6C and 6D are bottom views of third layer 603 (e.g., corresponding to layer 333 and/or layer 337 in FIG. 3C) and fourth layer 604 (e.g., corresponding to layer 334 and/or layer 338 in FIG. 3C).

As shown in the exemplary coil layers of FIGS. 6A-6D, in second coil layer 602 each electromagnetic coil 612a and 612b has an angular offset of one-fourth of a coil width from one of the electromagnetic coils 611a and/or 611b in the first coil layer 601. In third coil layer 603 each electromagnetic coil 613 a and b has an angular offset of one-fourth of a coil width from one of the electromagnetic coils 611a and/or 611b in the first coil layer 602. In fourth coil layer 604 each electromagnetic coil 614 a and b has an angular offset of one-half of a coil width from one of the electromagnetic coils 611a and/or 611b in the first coil layer. The four layers may be repeated to produce a desired number of layers (e.g., eight coil layers as shown in FIG. 3C).

Exemplary Sensor and Drive Signals

Figure 7A:
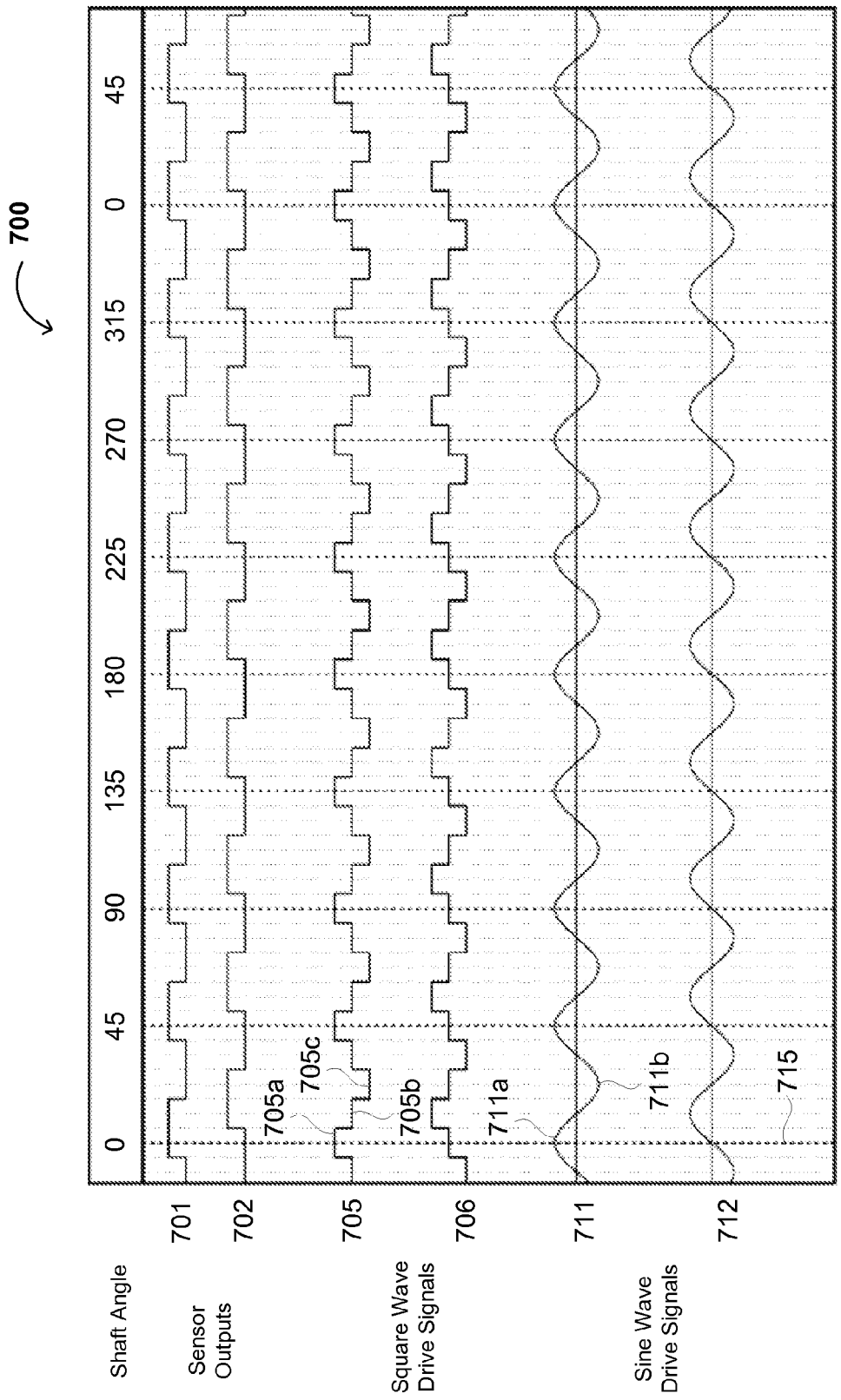
FIG. 7A is a graph of sensor input signals and output drive signals applied to coil layers in an exemplary two-phase 16-magnet motor according to the present invention.

Referring again to FIG. 1, the controller (not shown) may be configured to adjust the drive frequency (e.g., the frequency of each of the first, second, third, and/or fourth drive signals) in response to the output of one or more sensors 102. FIG. 7A is a graph 700 of sensor input signals (e.g., outputs of two or more sensors 102) and output drive signals (e.g., signals produced by the controller) applied to coil layers in an exemplary two-phase 16-magnet motor according to the present invention. In a two-phase motor, each coil assembly may include one or more first coil layers in a first phase (e.g., coil layer 601 of FIG. 6A) and one or more second coil layers in a second phase (e.g., coil layer 602 of FIG. 6B). The coils in the second layers are offset halfway between the coils of the first layer. Each coil assembly may include multiple layers in each phase.

Waveforms 701 and 702 show output signals from a first sensor and a second sensor, respectively. Sensor output 701 generally corresponds to a position of the magnets with respect to the coils in the first coil layer (e.g., coil layer 601). Sensor output 702 generally corresponds to a position of the magnets with respect to the coils in the second coils layer. The sensors may include Hall-effect sensors. Sensor outputs 701 and 702 may be binary signals whose values alternate with the polarity of the magnetic fields (e.g., the magnetic fields produced by magnets 121a and 121b in FIGS. 6A and 6B) as the magnets pass over the coils.

Square wave drive signal 705 may be applied to the first coil layer 601 and square wave drive signal 706 may be applied to the second coil layer 602. As described with respect to coils 611a and 611b, the direction of the current provided to alternating coils 611a and 611b may be reversed. Thus, coils 611a may receive drive signal 705 while coils 611b may receive an effectively reversed drive signal. The phase of the drive signal provided to each layer generally corresponds to the position of the coils in each layer.

The motor generally produces maximum torque by adjusting the drive signal (e.g., in response to a sensor output 701) to have a peak current when the interfaces between coil layers are directly over one of the fixed magnets. For example, if FIGS. 6A-6D represent the positions of coil layers 601 and 602 with respect to fixed magnets 121*a* and 121*b* at time 715 in FIG. 7A, then drive signal 705 is at a peak positive value 705*a* such that the coil wires in region 641*a* of FIG. 6A have a peak outward current flow when they are centered over a fixed magnet 121*a*. At the same moment, the coil wires in region 641*b* of FIG. 6A have a peak inward current flow when they are centered over a fixed magnet 121*b*. Similarly, drive signal 705 should be at or near zero (e.g., at level 705*b*) when the interface between the coils is between magnets.

The drive signal may be a simple square wave such as drive signal 705. The square wave drive signal 705 may have peak positive value 705*a*, a zero value at 705*b*, or a peak negative value 705*c*, with short transitions between each value. Such a square wave drive signal may be desirable when starting the motor and/or at up to several hundred RPM. Alternatively, the drive signal may be sine wave such as sine wave drive signal 711, with smooth transitions between peak positive value 711*a* and peak negative value 711*b*.

At time 715 in FIG. 7A, square wave drive signal 706 and sine wave drive signal 712 are approximately zero at the moment when coils 612*a* and 612*b* of second layer 602 are directly over the fixed magnets 121*a* and 121*b* (e.g., the interfaces between the coils are between magnets). Thus, while the first drive signal 711 (or square wave drive signal 705) provided to layer 601 has a first phase, the second drive signal 712 (or square wave drive signal 706) provided to layer 602 has a second phase that is offset 90° from the first phase. It will be recognized that the amplitude (e.g., the peak current and/or peak voltage) and/or frequency of the drive signals may vary in response to the rotational velocity of the motor, the desired output torque, or other factors, but that the phase relationship between the drive signals generally remains the same.

Figure 7B:
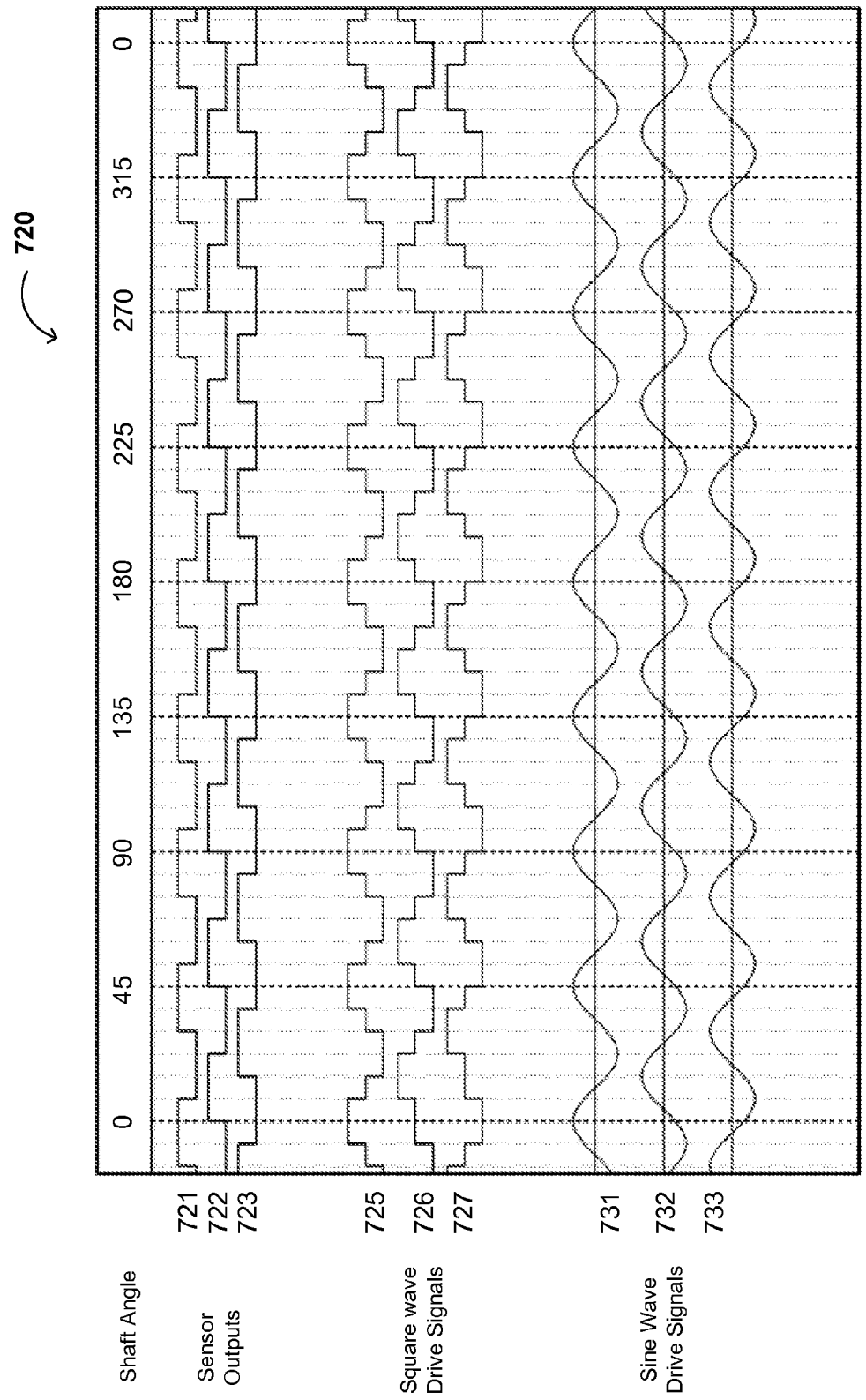
FIG. 7B is a graph of sensor input signals and output drive signals applied to coil layers in an exemplary three-phase 16-magnet motor according to the present invention.

FIG. 7B shows a graph 720 of sensor input signals and drive output signals applied to coil layers in an exemplary three-phase 16-magnet motor according to the present invention. In a three-phase motor, each coil assembly may include one or more layers of coils in each of the three phases. Thus, waveforms 721-723 show output signals from sensors that generally detect a position of the fixed magnets with respect to the coils in each of the three phases. Similarly, square wave drive signals 725-727 and sine wave drive signals 731-733 are drive signals that may be applied to the coils in each of the three phases.

Figure 7C:
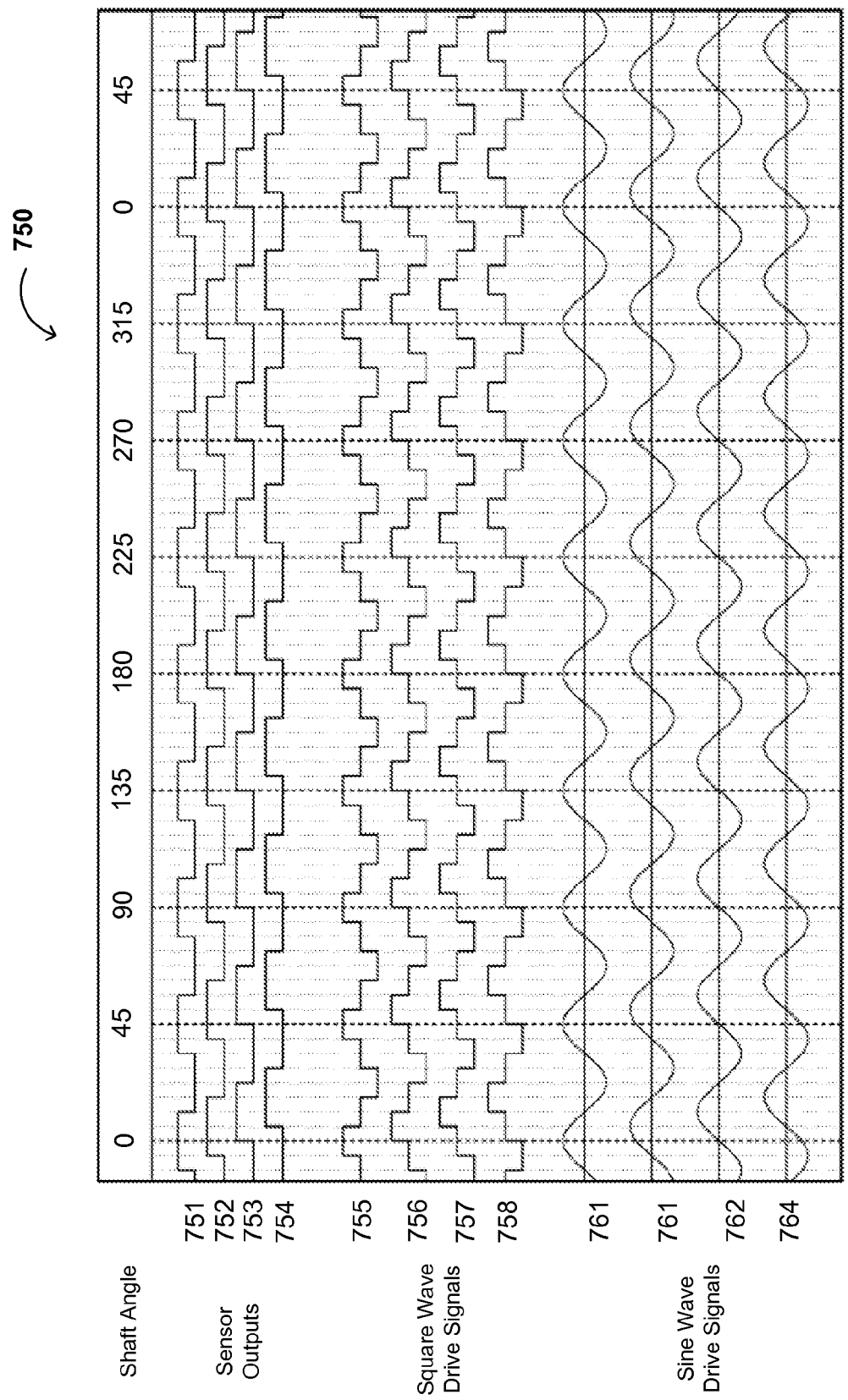
FIG. 7C is a graph of sensor input signals and output drive signals applied to coil layers in an exemplary four-phase 16-magnet motor according to the present invention.

FIG. 7C shows a graph 750 of sensor input signals and drive output signals applied to coil layers in an exemplary four-phase 16-magnet motor according to the present invention. In a four-phase motor, each coil assembly may include one or more layers of coils in each of the four phases (e.g., coil layers 601-604 of FIGS. 6A-D). Thus, waveforms 751-754 show output signals from sensors that generally detect a position of the fixed magnets with respect to the coils in each of the four phases. Similarly, square wave drive signals 755-758 and sine wave drive signals 761-764 are drive signals that may be applied to the coils in each of the four phases.

Figure 8:
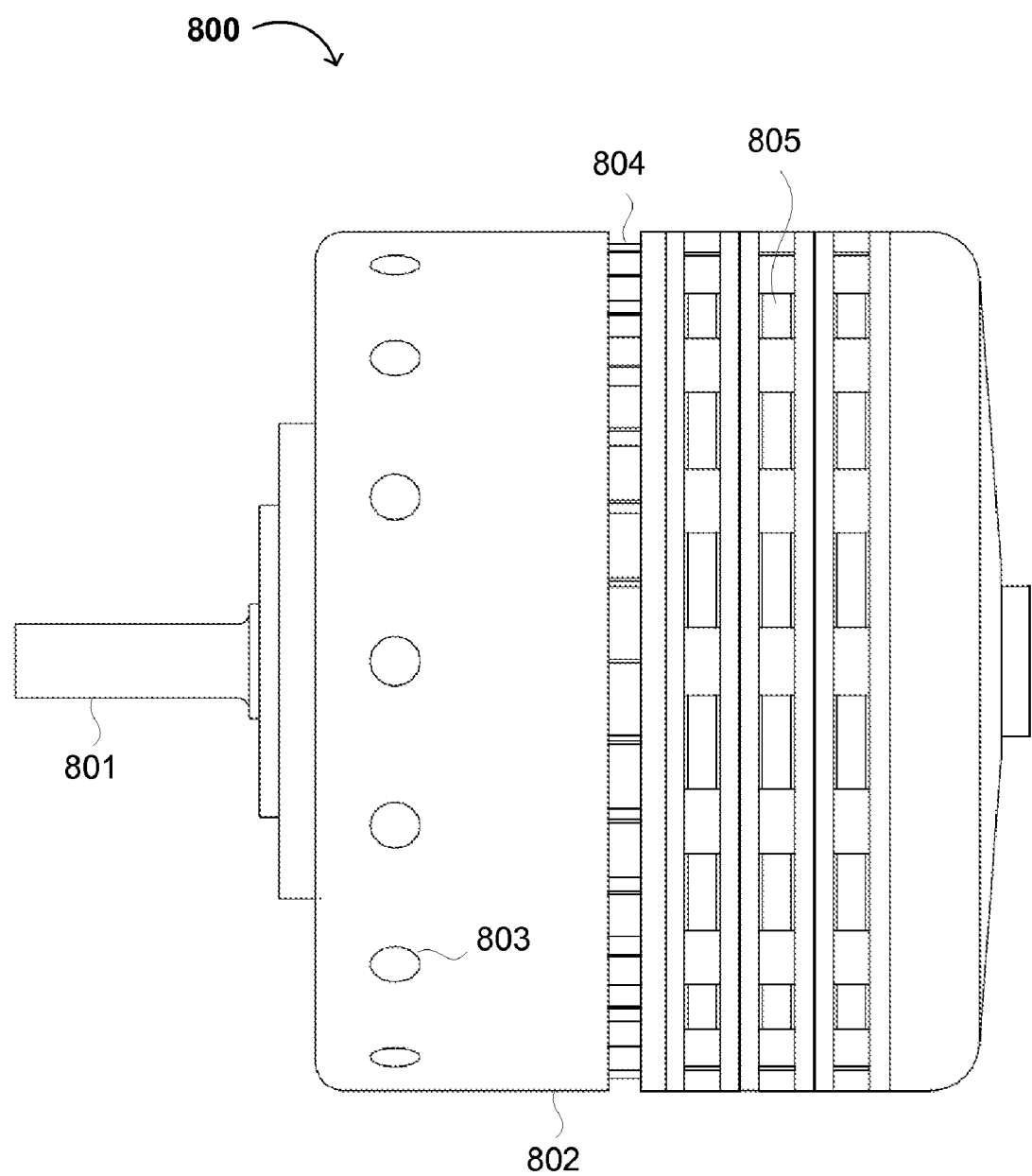
FIG. 8 is a drawing of an external motor housing of a motor according to the present invention.

Finally, FIG. 8 shows an exemplary outer housing 802 of a motor 800 according to the present invention. Shaft 801 extends from the motor. The housing generally has cooling air intakes 803, cooling exhaust vents 804, and motor cooling exhaust vents 805. It will be recognized that a person skilled in the art can provide an appropriate housing based on the size of the motor (including, e.g., the number of coil assemblies included in the motor) and the expected air intake and exhaust requirements.

Exemplary Applications

Electric motors according to the present invention may be used in a variety of applications. For example, motors according to the present invention may include "bolt-in" replacements for standard sized 4" and 8.75" inch motors. Leisure applications of motors according to the present invention may include wheeled vehicles such as golf carts, neighborhood electrical vehicles (NEVs), electric bicycles and motorcycles. Smaller motors may be used by hobbyists in radio-controlled wheeled vehicles and aircraft. Industrial applications may include electrical burden and/or utility carriers and electric tow tractors. More advanced applications may include electric and/or hybrid vehicles, military scout vehicles and unmanned aerial vehicles (UAVs). This list of application is not exhaustive, but is merely exemplary of the wide range of application to which motors according to the present invention may be put.

CONCLUSION/SUMMARY

Thus, the present invention provides efficient apparatuses, circuits, and methods for driving an axial field electric motor, and systems using the same. Electric motors according to the present invention are advantageously efficient and lightweight and provide for a modular arrangement where coil assemblies can be added to or removed from a stack of such assemblies to provide an appropriate weight, torque, power consumption, etc. for a particular application.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An electric motor, comprising:

a fixed magnet assembly comprising a plurality of fixed magnets arranged circularly around a shaft, wherein said fixed magnets have north-south axes parallel to said shaft;

a coil assembly comprising a plurality of coil layers arranged in a stack, each coil layer in said stack comprising a plurality of electromagnetic coils arranged circularly around said shaft, each of said electromagnetic coils having a top side and a bottom side, and comprising a plurality of conductive coil winds, a first lead, and a second lead, wherein said plurality of coil winds and said first lead are in a first plane and said second lead either crosses above said coil winds in a second plane or below said coil winds in a third plane, said stack of coil layers comprising:

a first layer of electromagnetic coils, wherein said coil winds and said first leads of each electromagnetic coil are in said first plane that is substantially perpendicular to said shaft, and said second leads of each of said electromagnetic coils cross below said coil winds in said second plane that is substantially perpendicular to said shaft, a second layer of electromagnetic coils adjacent to said first layer of electromagnetic coils, wherein said coil winds and said first leads of each electromagnetic coil are in said second plane, and said second leads of each electromagnetic coil cross above said coil winds and are in said first plane, such that said second leads of said electromagnetic coils in said second layer are between coil winds of said electromagnetic coils in said first layer, and said second leads of said electromagnetic coils in said first layer are between said coil winds of said electromagnetic coils in said second layer, and each of said coil layers is mechanically coupled to another of said coil layers; and a controller configured to provide each of a plurality of drive signals to one of said coil layers, wherein each of said drive signals has a different phase.

2. The electric motor of claim 1, wherein said conductive spiral comprises a wire having a metallic core and a thermoplastic coating.

3. The electric motor of claim 2, wherein said thermoplastic coating of each wind of each of said electromagnetic coils is fused to said thermoplastic coating of an adjacent wind of said coil.

4. The electric motor of claim 2, wherein said thermoplastic coating of said electromagnetic coils of each coil layer is fused to said thermoplastic coating of said electromagnetic coils of another coil layer.

5. The electric motor of claim 2, wherein said wire further comprises an insulator between said metallic core and said thermoplastic coating.

6. The electric motor of claim 5, wherein said thermoplastic coating has a lower melting temperature than said insulator.

7. The electric motor of claim 1, further comprising a rotor, said rotor comprising said fixed magnets and said shaft.

8. The electric motor claim 7, further comprising a sensor configured to sense a position of at least one of said fixed magnets.

9. The electric motor of claim 8, wherein said sensor comprises a Hall-effect sensor.

10. The electric motor of claim 8, wherein said controller is further configured to adjust one or more of said drive signals in response to a sensor output.

11. The electric motor of claim 1, wherein each electromagnetic coil of said second coil layer has an angular offset of half of its width from one of said electromagnetic coils in said first coil layer.

12. The electric motor of claim 11, wherein:
said plurality of drive signals comprises a first drive signal having a first phase and a second drive signal having a second phase that is offset 90° from said first phase; and
said controller is configured to provide said first drive signal to said electromagnetic coils of said first coil layer and to provide said second drive signal to said electromagnetic coils of said second coil layer.

13. The electric motor of claim 1, wherein
each electromagnetic coil of said second coil layer has an angular offset of one-third of its width from one of said electromagnetic coils in said first coil layer.

14. The electric motor of claim 13, wherein said plurality of drive signals comprises:

a first drive signal having a first phase;

a second drive signal having a second phase that is offset 60° from said first phase; and a third drive signal having a third phase that is offset 120° from said first phase.

15. The electric motor of claim 1, wherein said plurality of coil layers comprises:

a third coil layer and a fourth coil layer;

wherein each electromagnetic coil of said second coil layer has an angular offset of one-half of its width from one of said electromagnetic coils in said first coil layer;

each electromagnetic coil of said third coil layer has an angular offset of one-fourth of its width from one of said electromagnetic coils in said first coil layer; and each electromagnetic coil of said fourth coil layer has an angular offset of one-half of its width from one of said electromagnetic coils in said third coil layer.

16. The electric motor of claim 15, wherein said coil assembly comprises two of each of said first, second, third, and fourth layers of electromagnetic coils.

17. The electric motor of claim 15, wherein said plurality of drive signals comprises:

a first drive signal having a first phase;

a second drive signal having a second phase that is offset 90° from said first phase;

a third drive signal having a third phase that is offset 45° from said first phase; and a fourth drive signal having a fourth phase that is offset 135° from said first phase.

18. The electric motor of claim 1, wherein said coil assembly further comprises a coil assembly base configured to electrically couple each of said drive signals to electromagnetic coils in one of said coil layers.

19. The electric motor of claim 18, wherein said coil assembly base comprises:

two printed circuit boards, wherein each of said electromagnetic coils is electrically coupled to one of said printed circuit boards; and a plurality of conductive stand-offs, each of said stand-offs being mechanically coupled to said printed circuit boards and electrically coupled to one or more of said electromagnetic coils.

20. The electric motor of claim 19, comprising a plurality of said coil assemblies, wherein said conductive stand-offs of each of said plurality of coil assemblies are electrically and mechanically coupled to corresponding conductive stand-offs in another one of said coil assemblies.

21. The electric motor of claim 19, wherein said conductive stand-offs comprise metallic bushings with openings to accommodate bolts.

22. The electric motor of claim 21, wherein said openings are smooth, threaded, or notched.

23. The electric motor of claim 1, comprising a plurality of said coil assemblies.

24. The electric motor of claim 23, comprising a plurality of said fixed magnet assemblies, wherein at least one of said fixed magnet assemblies is located between two of said coil assemblies.

25. The electric motor of claim 1, wherein said drive signals comprise square wave signals.

26. The electric motor of claim 1, wherein said drive signals comprise sine wave signals.

27. The electric motor of claim 1, further comprising a motor housing having a cooling air intakes, cooling exhaust vents, and motor cooling exhaust vents.

28. The electric motor of claim 27, wherein said controller is integrated in said motor housing.

29. The electric motor of claim 1, wherein said controller comprises a power supply, a processor, and a digital-to-analog converter.

30. The electric motor of claim 1, wherein said coil assembly comprises of from 2 to 8 coil layers.

* * * * *